(12) United States Patent
Sasaki

(10) Patent No.: US 8,251,596 B2
(45) Date of Patent: Aug. 28, 2012

(54) IMAGING APPARATUS

(75) Inventor: Daisuke Sasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 111 days.

(21) Appl. No.: 12/838,357

(22) Filed: Jul. 16, 2010

(65) Prior Publication Data

US 2011/0033179 A1 Feb. 10, 2011

(30) Foreign Application Priority Data

Aug. 6, 2009 (JP) ................................. 2009-183630

(51) Int. Cl.
*G03B 17/02* (2006.01)
*H04N 7/18* (2006.01)

(52) U.S. Cl. ......................... 396/427; 396/535; 348/151

(58) Field of Classification Search .................. 396/427, 396/448, 535; 411/14.5; 359/811; 348/151
See application file for complete search history.

(56) References Cited

U.S. PATENT DOCUMENTS

| | | | | |
|---|---|---|---|---|
| 3,332,182 A | * | 7/1967 | Mark | ........................ 52/127.12 |
| 4,945,367 A | * | 7/1990 | Blackshear | ................... 396/427 |
| 7,170,560 B2 | * | 1/2007 | Tatewaki et al. | .............. 348/375 |
| 7,388,616 B2 | * | 6/2008 | Yamazaki | ...................... 348/373 |
| 7,787,044 B2 | * | 8/2010 | Chang | ............................ 348/357 |
| 2003/0098908 A1 | * | 5/2003 | Misaiji et al. | ................. 348/148 |
| 2003/0103160 A1 | | 6/2003 | Tatewaki | |
| 2004/0157652 A1 | | 8/2004 | Yamazaki | |
| 2009/0174785 A1 | * | 7/2009 | Uchida | ...................... 348/222.1 |

FOREIGN PATENT DOCUMENTS

| | | |
|---|---|---|
| JP | 2003-174572 A | 6/2003 |
| JP | 2004-180223 A | 6/2004 |

* cited by examiner

*Primary Examiner* — Clayton E Laballe
*Assistant Examiner* — Leon W Rhodes, Jr.
(74) *Attorney, Agent, or Firm* — Carter, DeLuca, Farrell & Schmidt, LLP

(57) ABSTRACT

An imaging apparatus allows an interior structure including a camera unit to make a retreating movement in response to a shock applied to a cover from various directions. The imaging apparatus includes a camera unit including a lens and an image sensor, a dome cover covering the camera unit, a tilt support stand tilt-rotatably supporting the camera unit, a pan rotary support member pan-rotating together with the tilt support stand, and an elastic member arranged on the pan rotary support member and imparting an urging force to the tilt support stand. When a force is applied from the dome cover, the camera unit can make a retreating movement in a vertical direction and a slanting direction.

18 Claims, 14 Drawing Sheets

WHEN CAMERA IS OPERATING

WHEN SLANTING FOR SHOCK ABSORPTION

WHEN CAMERA IS OPERATING

WHEN SLANTING FOR
SHOCK ABSORPTION

WHEN CAMERA IS OPERATING

WHEN SLANTING FOR
SHOCK ABSORPTION

WHEN CAMERA IS OPERATING

WHEN SLANTING FOR
SHOCK ABSORPTION

PRIOR ART

IMAGING APPARATUS

BACKGROUND OF THE INVENTION

1. Field of the Invention

The present invention relates to an imaging apparatus equipped with a shock absorbing mechanism.

2. Description of the Related Art

In a conventional monitoring camera apparatus, a dome cover covering a camera unit is formed of polycarbonate resin or the like, which exhibits shock resistance, and an exterior casing covering a camera main body is formed of metal, thereby providing a shock resistance performance. However, unlike the exterior casing formed of metal, the dome cover, which is formed of resin, may, if not fractured, momentarily suffer a great deformation by a shock. Thus, when an impact of not less than a fixed level is applied, it can happen that the deformed dome cover comes into contact with an interior structure such as the camera unit to damage the interior structure, disabling it from functioning.

To solve the above problem, Japanese Patent Application Laid-Open No. 2003-174572, for example, discusses a monitoring camera apparatus equipped with a shock absorbing mechanism. A monitoring camera apparatus equipped with a conventional shock absorbing mechanism will be described below with reference to FIG. 10.

A rotation stand 301, which is a support member supporting a camera unit 300, is fixed in position by means of a shaft screw 304 passed through an elongated hole 302a vertically provided in a post of a rotation bracket 302. A coil spring 303 is provided between the shaft screw 304 and the post. Due to this construction, the rotation stand 301 is supported so as to be rotatable in the vertical direction and capable of linear movement in the vertical direction, so that it is possible to absorb a shock when a cover 305 is hit, thus preventing the camera unit 300 from being damaged.

In the conventional monitoring camera apparatus equipped with a shock absorbing mechanism, the camera unit 300 is capable of linear movement in the vertical direction, so that the camera unit 300 can retreat to absorb a shock from a direction perpendicular to the dome cover. However, in the case of a shock applied from a direction oblique or horizontal with respect to the dome cover, the interior structure inclusive of the camera unit 300 cannot always make a retreating movement, which means there is a fear of the camera unit suffering damage by the shock.

In most cases, a monitoring camera apparatus is mounted to a ceiling or a wall surface, so that one must expect an external shock to be applied thereto from every possible direction with respect to the dome cover thereof, which means the above conventional construction is rather inadequate.

SUMMARY OF THE INVENTION

The present invention is directed to an imaging apparatus whose interior structure including a camera unit is capable of making a retreating movement in response to a shock applied to a cover thereof from various directions.

According to an aspect of the present invention, there is provided an imaging apparatus equipped with a shock absorbing mechanism, including: a camera unit including a lens and an image sensor; a cover covering the camera unit; and an elastic member elastically supporting the camera unit so as to allow the camera unit to make a retreating movement in a vertical direction and a slanting direction when a force is applied from the cover.

According to another aspect of the present invention, the camera unit can make a retreating movement in the vertical direction and a slanting direction when a force is applied thereto from the cover, so that shock absorption is possible with respect to a shock applied to the cover from various directions, making it possible to prevent the interior structure from being damaged.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
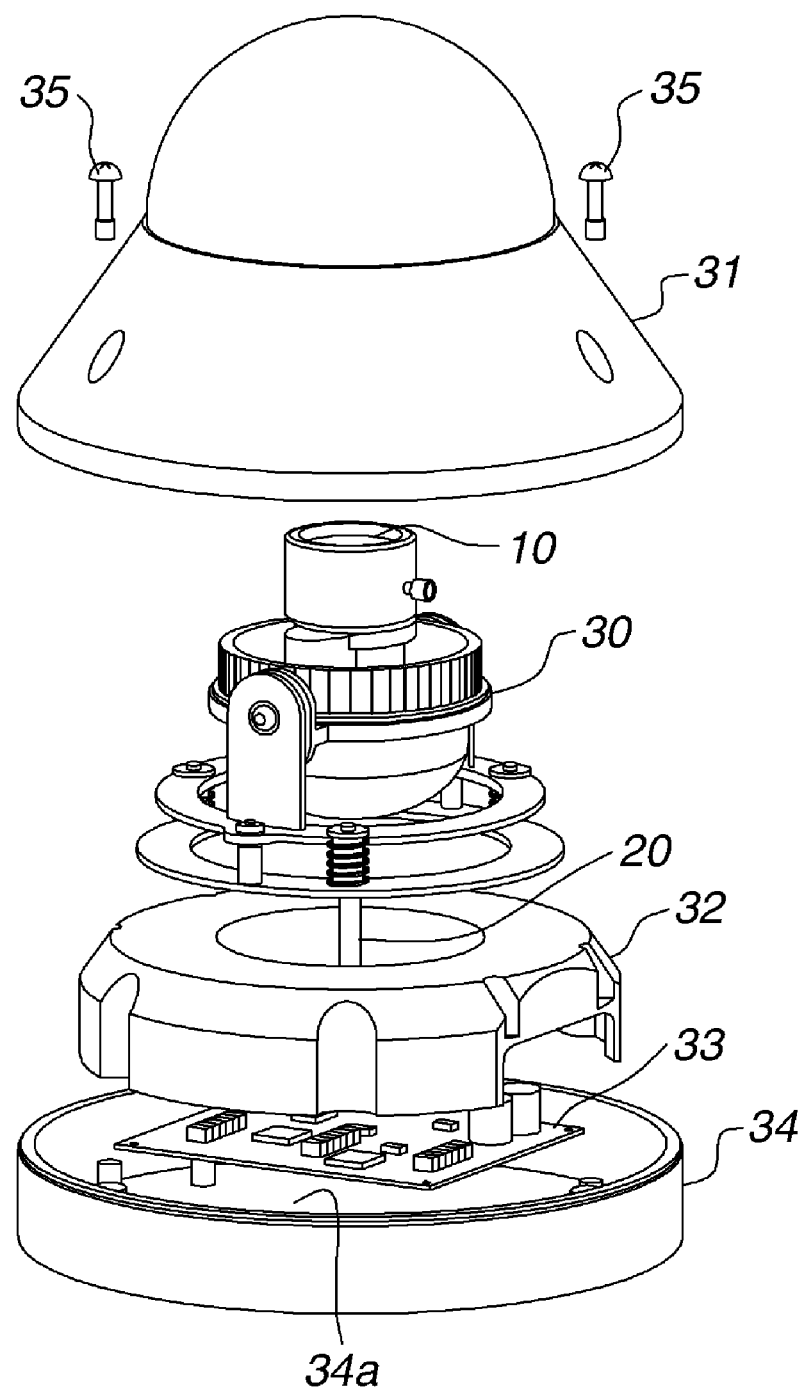
FIG. 1 is a unit assembly diagram illustrating a monitoring camera apparatus according to a first exemplary embodiment of the present invention.

FIG. 1 is a unit assembly diagram illustrating an imaging apparatus, more specifically, a monitoring camera apparatus, according to the first exemplary embodiment. The monitoring camera apparatus of the present exemplary embodiment is equipped with a shock absorbing mechanism allowing a camera unit to make a retreating movement in a vertical direction and in a slanting direction. In this specification, the expression "vertical direction" refers to a direction perpendicular to the installation surface of the imaging apparatus. In the first exemplary embodiment, it means a direction perpendicular to the installation surface of the monitoring camera apparatus, in other words, a direction perpendicular to the bottom surface of a stationary stand portion 34.

A camera unit 10 includes a lens and an image sensor. A rotary support unit 30 supports the camera unit 10 so as to allow it to rotate around an optical axis and in a tilting direction. A base portion 32 supports the rotary support unit 30 so as to allow it to rotate in a panning direction.

The stationary stand portion 34 fixedly supports the base portion 32 and a circuit board 33. An exterior unit 31 equipped with a dome cover is fixed to the stationary stand portion 34 by mounting screws 35, and covers an interior structure including the camera unit 10. A transmission cable 20 transmitting a signal from the image sensor contained in the camera unit 10, is passed through a hole provided at the center of the base portion 32, and is connected to the circuit board 33.

Figure 2A:
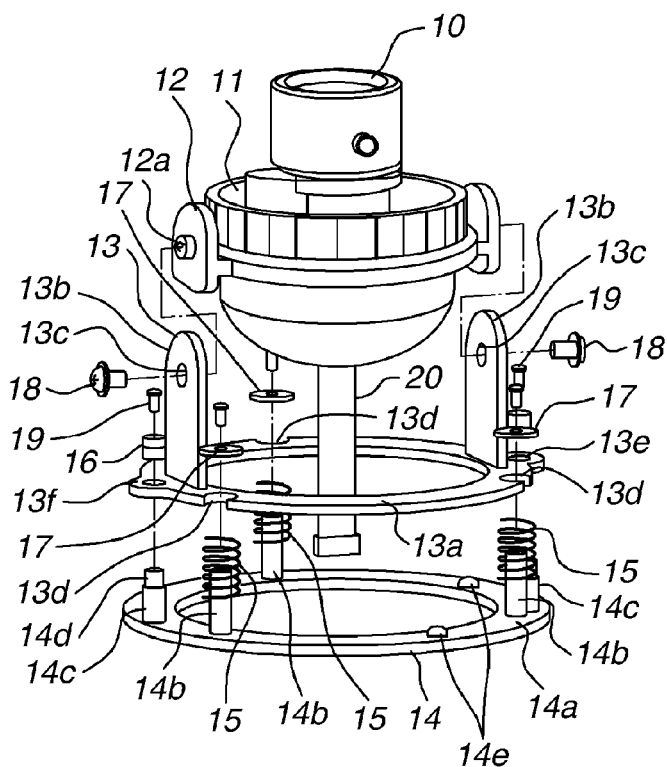
FIGS. 2A and 2B are assembly diagrams illustrating a rotary support unit according to the first exemplary embodiment.
Figure 2B:
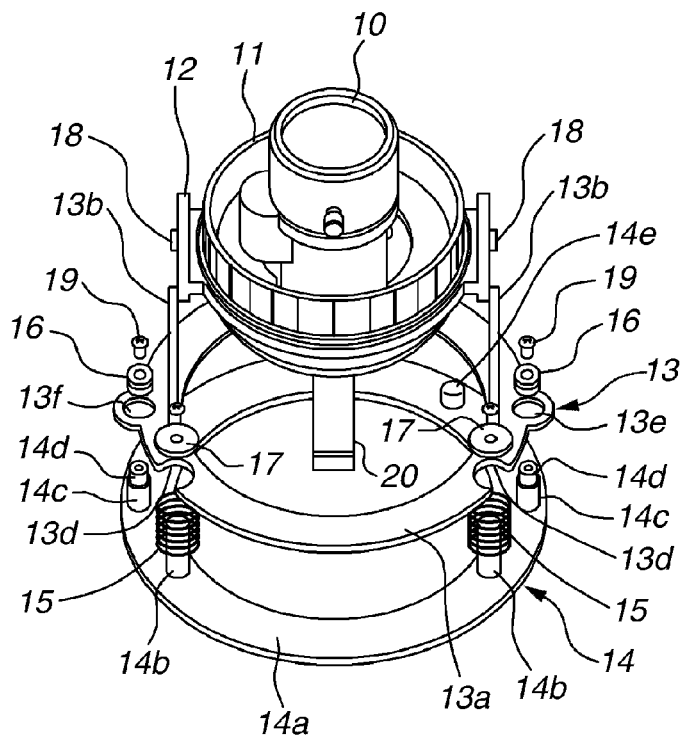

FIGS. 2A and 2B are detailed diagrams illustrating how the rotary support unit 30 is assembled. The camera unit 10 is fixed to an optical-axis rotary support member 11 rotatable around the optical axis. A tilt rotary support member 12 supports the optical-axis rotary support member 11, and has on both sides thereof a pair of protrusions 12a; and the tilt rotary support member 12 is supported by a tilt support stand 13 so as to be capable of tilt rotation.

The tilt support stand 13, which is a first support member, is equipped with an annular base plate portion 13a, and a pair of support portions 13b erected on the base plate portion 13a, and rotatably supports the protrusions 12a of the tilt rotary support member 12 by means of holes 13c provided in the support portions 13b. Screw holes are formed in the protrusions 12a of the tilt rotary support member 12. Detachment prevention screws 18 are fastened to these screw holes, whereby the tilt rotary support member 12 is assembled to the tilt support stand 13 so as to be capable of tilt rotation.

A pan rotary support member 14, which is a second support member, is equipped with an annular base plate portion 14a, and is supported by the base portion 32 so as to be capable of pan rotation. Three bar-like guide portions 14b are erected at equal intervals on the base plate portion 14a, and a coil spring constituting an elastic member 15 is arranged and retained around each guide portion 14b.

As described below, the elastic members 15 elastically support the camera unit 10 so as to allow the camera unit 10 to make a retreating movement in the vertical direction and a slanting direction when a force is applied thereto from the dome cover.

The base plate portion 13a of the tilt support stand 13 has cutouts 13d, which allow the passing of the guide portions 14b therethrough but do not allow the passing of the elastic members 15 therethrough. With the guide portions 14b passed through the cutouts 13d, stopper members 17 are screwed on the upper ends of the guide portions 14b.

Figure 4A:
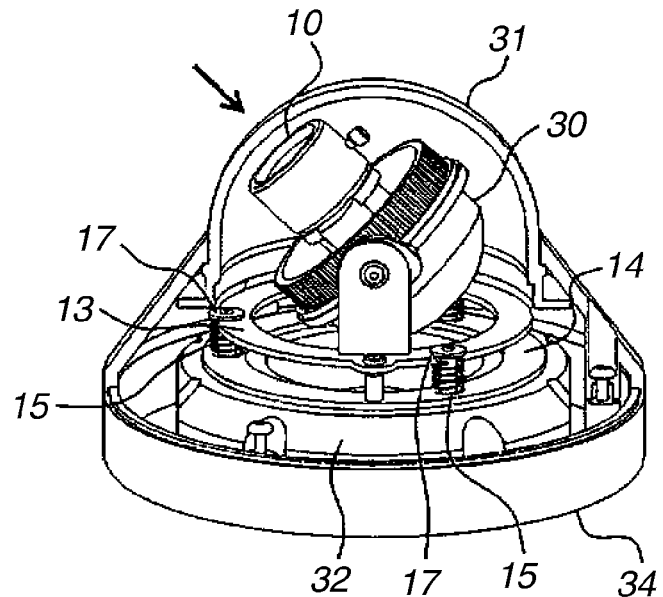
FIGS. 4A and 4B are diagrams illustrating the interior state when a camera is operating and when a shock absorbing mechanism is operating according to the first exemplary embodiment.

As a result, the tilt support stand 13 is urged in the vertical direction (in the direction of the dome cover) by the elastic members 15 arranged and retained around the guide portions 14b, and is maintained at a predetermined height position by the stopper members 17 (See FIG. 4A). While in the present exemplary embodiment the cutouts 13d are formed, it is also possible to form holes instead.

A pair of retaining portions 14c are erected on the base plate portion 14a of the pan rotary support member 14. Fit-engagement portions 14d reduced in diameter are formed at the distal ends of the retaining portions 14c, and positioning members 16 are fixed to the fit-engagement portions 14d. As long as they are capable of fit-engagement with the positioning members 16, it is not necessary for the fit-engagement portions 14d to be reduced in diameter.

Further, the base plate portion 13a of the tilt support stand 13 has a hole 13e and an elongated hole 13f to be fit-engaged with part of the positioning members 16. While the present exemplary embodiment employs the hole 13e and the elongated hole 13f, it is also possible to provide cutout portions instead.

The base plate portion 14a of the pan rotary support member 14 is provided with two convex portions 14e that come into contact with the tilt support stand 13 when the tilt support stand 13 moves more than a fixed level in the vertical direction or in a slanting direction. It is also possible to provide two or more such convex portions 14e.

Due to the provision of the convex portions 14e, it is possible to regulate the movable range of the tilt support stand 13, and to prevent chafing between the hole 13e or the elongated hole 13d of the tilt support stand 13 and the retaining portions 14c erected on the base plate portion 14a of the pan rotary support member 14. This will be described in detail below with reference to FIGS. 3A and 3B.

Figure 3A:
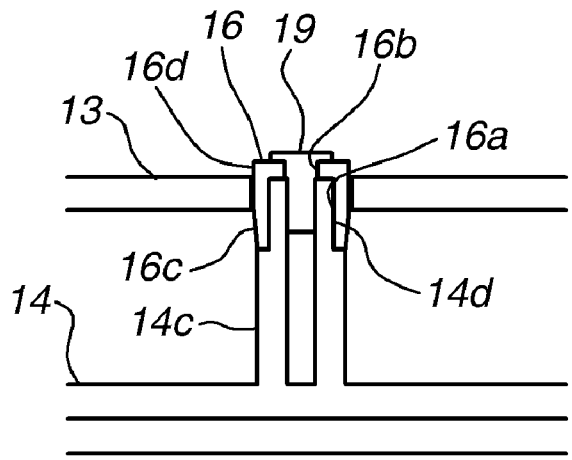
FIGS. 3A and 3B are sectional views illustrating a tilt support stand and a positioning member according to the first exemplary embodiment.
Figure 3B:
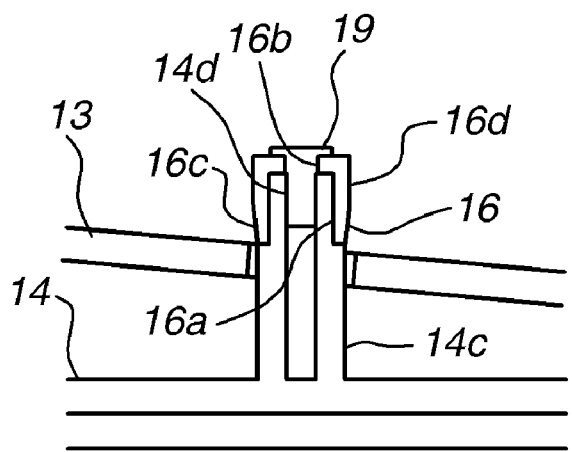

As illustrated in FIGS. 3A and 3B, each positioning member 16 has a fit-engagement hole portion 16a to be fit-engaged with the fit-engagement portion 14d of the retaining portion 14c, and a screw hole portion 16b to be fixed to the retaining portion 14c by a screw 19. Further, the positioning members 16 have fit-engagement portions 16d fit-engaged with the hole 13e and the elongated hole 13f of the tilt support stand 13 in a state in which the tilt support stand 13 is being urged by the elastic members 15 and maintained at a predetermined height position by the stopper members 17. Further, on the side opposite to the dome cover, each positioning member 16 has a tapered portion 16c continuous with the fit-engagement portion 16d so as to be gradually reduced in diameter as it extends therefrom.

As illustrated in FIGS. 3A and 4A, in the monitoring camera apparatus according to the present exemplary embodiment, the tilt support stand 13 is urged by the elastic members 15, and is maintained at a predetermined height position by the stopper members 17. At this time, the fit-engagement portions 16d of the positioning members 16 are fit-engaged with the hole 13e and the elongated hole 13f of the tilt support stand 13, so that the tilt support stand 13 is fixed in position and direction. Hereinafter, this state will be referred to as the normal state.

Figure 4B:
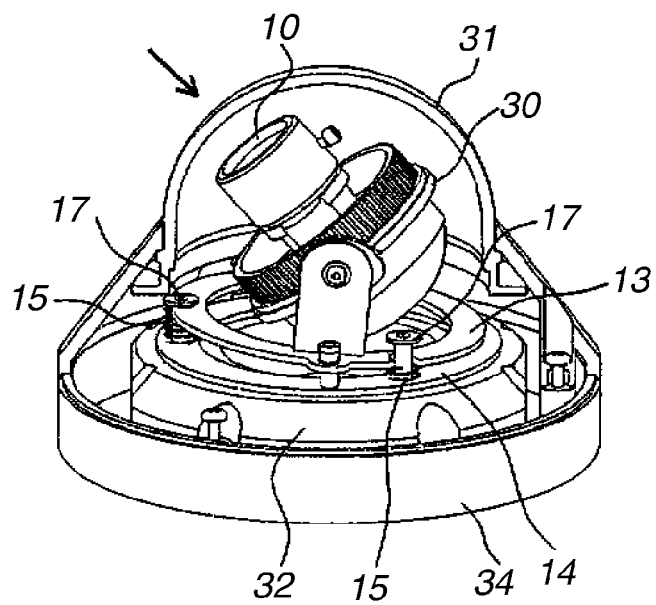

And, as illustrated in FIGS. 3B and 4B, when a shock is applied to the dome cover, and a force acts on the camera unit 10, the tilt support stand 13 moves slightly downwards, and the fit-engagement thereof with the fit-engagement portions 16d of the positioning members 16 is released. At this time, a clearance is secured between the positioning members 16 and the hole 13e and the elongated hole 13f of the tilt support stand 13 due to the tapered portions 16c, whereby the tilt support stand 13 is also allowed to move in a slanting direction.

Figure 5A:
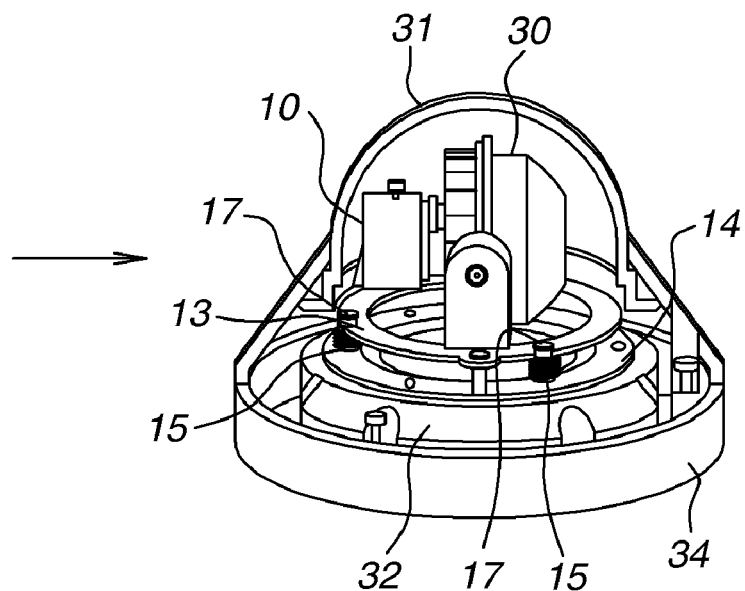
FIGS. 5A and 5B are diagrams illustrating the interior state of the monitoring camera apparatus when the camera is operating and when the shock absorbing mechanism is operating according to the first exemplary embodiment.
Figure 5B:
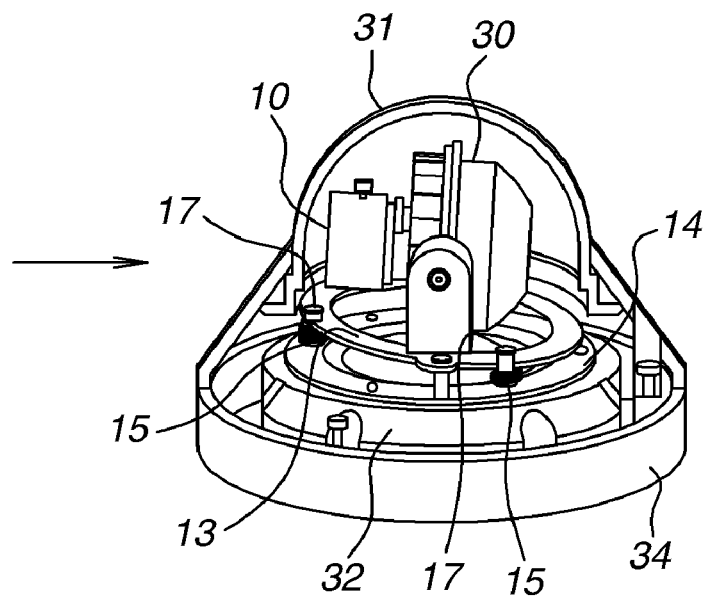

While FIGS. 4A and 4B illustrate a case in which a shock is applied from a direction oblique to the dome cover, shock absorption is also possible with respect to a shock applied from a direction horizontal to the dome cover. When, as illustrated in FIGS. 5A and 5B, a shock is applied from a direction horizontal to the dome cover, a moment load is applied, using as a fulcrum the guide portion 14b on the front side with respect to the shock direction, and the rear elastic member 15 is contracted, thereby moving the tilt support stand 13 in a slanting direction. In this way, shock absorption is possible with respect to a shock applied to the cover from various directions although the shock absorption amount varies as the shock direction is changed from a direction vertical to the dome cover to a direction horizontal thereto.

When, after this, the shock applied to the dome cover is damped, the tilt support stand 13, which is being urged by the elastic members 15, is restored to the normal state, with the hole 13e and the elongated hole 13f of the tilt support stand 13 being guided by the tapered portions 16c.

In FIGS. 3A and 3B, the clearance between the hole 13e (or the elongated hole 13f) of the tilt support stand 13 and the retaining portion 14c of the pan rotary support member 14 is reduced by the slanting movement of the tilt support stand 13. If the slanting angle of the tilt support stand 13 exceeds a predetermined amount, the hole 13e (or the elongated hole 13f) of the tilt support stand 13 and the retaining portion 14c of the pan rotary support member 14 are brought into contact with each other, with the result that chafing may be generated therebetween.

In view of this, the convex portions 14e are provided on the base plate portion 14a of the pan rotary support member 14, whereby it is possible to regulate the movable range of the tilt support stand 13 within a range not involving generation of chafing, thus making it possible to prevent damage of the hole 13e and the elongated hole 13f of the tilt support stand 13 and damage of the retaining portions 14c.

As described above, in the monitoring camera apparatus according to the present exemplary embodiment, the tilt support stand 13 is urged by the three elastic members 15 arranged and retained on the pan rotary support member 14, whereby the interior structure including the camera unit 10 can make a retreating movement in the vertical direction and in a slanting direction. As a result of this retreating movement of the camera unit 10, the distance between the dome cover and the camera unit 10 increases, whereby it is possible to shock-absorb the deformation amount of the dome cover corresponding to the increase in distance.

Further, due to the fit-engagement portions 16d of the positioning members 16, the camera unit 10 is fixed in position and direction when the camera is operating, and, due to the tapered portions 16c, the camera unit 10 can be accurately restored to the former operating position and direction after the retreating movement.

Further, the space in which the elastic members 15 held between the tilt support stand 13 and the pan rotary support member 14 are displaced, can also be used as a space for allowing the transmission cable 20 to move as rotation adjustment is made on the rotary support unit 30.

When rotation adjustment is made in the optical axis direction and the panning/tilting direction, the transmission cable 20 requires a fixed space, which allows it to move in conformity with the camera unit 10. Due to the provision of the elastic members 15 between the tilt support stand 13 and the pan rotary support member 14, the same space can serve as the requisite space for the movement of the transmission cable 20 and as the space in which the rotary support unit 30 can move, whereby it is possible to achieve a reduction in the size of the monitoring camera apparatus.

Further, due to the provision of the elastic members 15 between the tilt support stand 13 and the pan rotary support member 14, the length of the transmission cable 20, which will be bent when the interior structure including the camera unit 10 makes a retreating movement, can be made larger than in the case in which no elastic members 15 are provided.

The length of the transmission cable 20 can be increased by an amount corresponding to the displacement distance of the elastic members 15 held between the tilt support stand 13 and the pan rotary support member 14. As a result, the interior structure including the camera unit 10 can make a retreating movement in the vertical direction and a slanting direction, and, at the same time, the durability of the transmission cable 20 with respect to bending can be improved.

Although, in the present exemplary embodiment, the convex portions 14e are provided on the pan rotary support member 14, they may be provided on the tilt support stand 13 instead; so long as they can regulate the movable range of the tilt support stand 13, the convex portions 14e may be formed by separate components.

Figure 6:
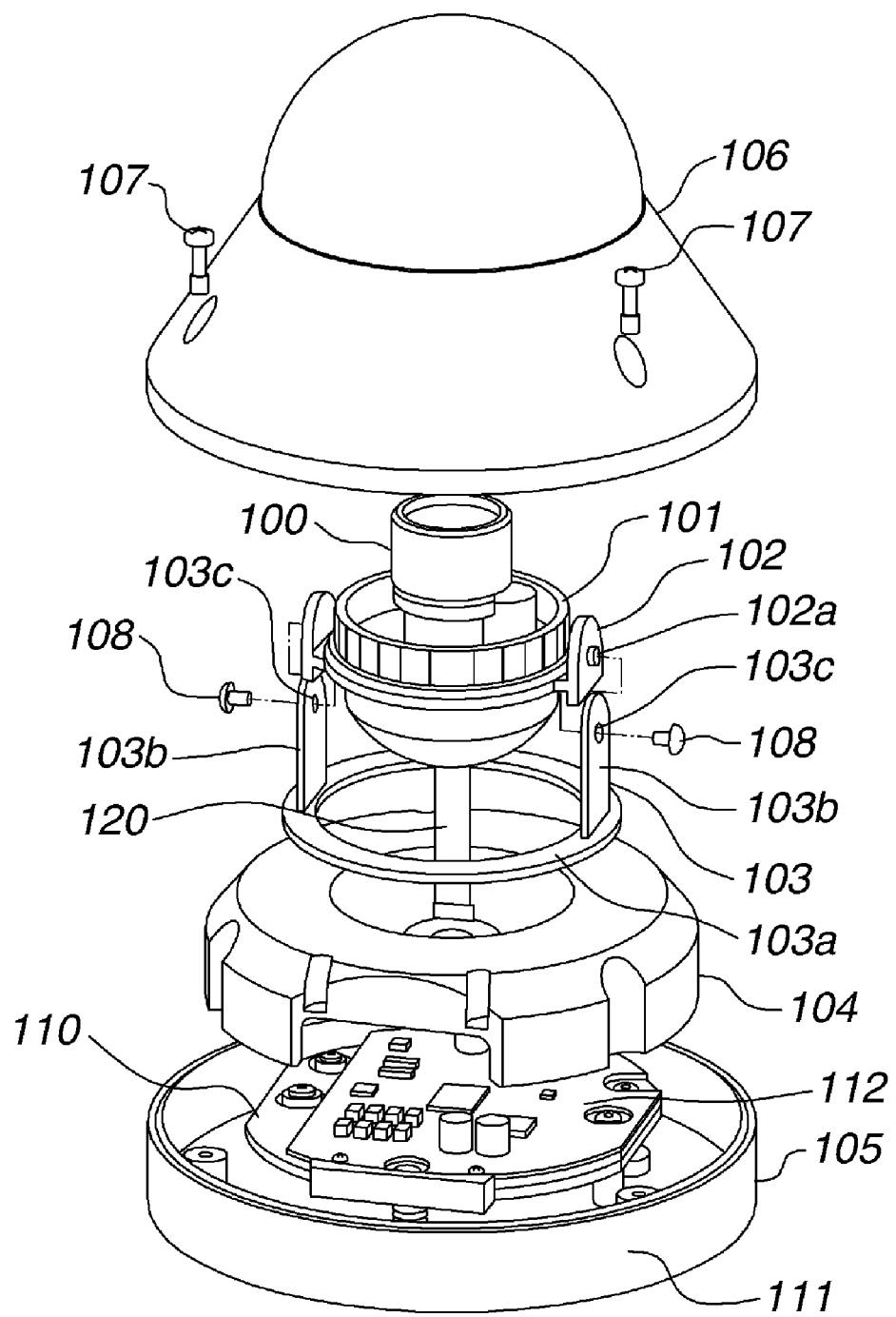
FIG. 6 is a unit assembly diagram illustrating a monitoring camera apparatus according to a second exemplary embodiment.

FIG. 6 is an assembly diagram illustrating an imaging apparatus, more specifically, a monitoring camera unit, according to a second exemplary embodiment. The monitoring camera apparatus of the present exemplary embodiment is equipped with a shock absorbing mechanism allowing a camera unit to make a retreating movement in the vertical direction and a slanting direction. In this specification, the vertical direction refers to a direction perpendicular to the installation surface of the imaging apparatus. In the second exemplary embodiment, it is a direction perpendicular to the installation surface of the monitoring camera apparatus, in other words, the bottom surface of a stationary stand portion 111.

A camera unit 100 includes a lens and an image sensor, and is fixed to an optical-axis rotary support member 101 rotatable around an optical axis. A tilt rotary support member 102 supports the optical-axis rotary support member 101, and has a pair of protrusions 102a on both sides thereof. The tilt rotary support member 102 is supported by a pan rotary support member 103 so as to be capable of tilt rotation.

The pan rotary support member 103 is equipped with an annular base plate portion 103a and a pair of support portions 103b erected on the base plate portion 103a. The protrusions 102a of the tilt rotary support member 102 are pivoted by holes 103c provided in the support portions 103b. The protrusions 102a of the tilt rotary support member 102 have screw holes. Detachment prevention screws 108 are fastened to these screw holes, whereby the tilt rotary support member 102 is assembled to the pan rotary support member 103 so as to be capable of tilt rotation.

The pan rotary support member 103 is supported by a base portion 104 so as to be capable of pan rotation. The base portion 104 is fixed to a movable base portion 110 of a stationary stand unit 105. The stationary stand unit 105 includes a stationary stand portion 111, the movable base portion 110, and a circuit board 112.

An exterior unit 106 with a dome cover is mounted to the stationary stand unit 105 by mounting screws 107, and covers an interior structure including the camera unit 100. A transmission cable 120 transmitting a signal from an image sensor contained in the camera unit 100 is connected to the circuit board 112 through a hole provided at the center of the base portion 104.

Figure 7A:
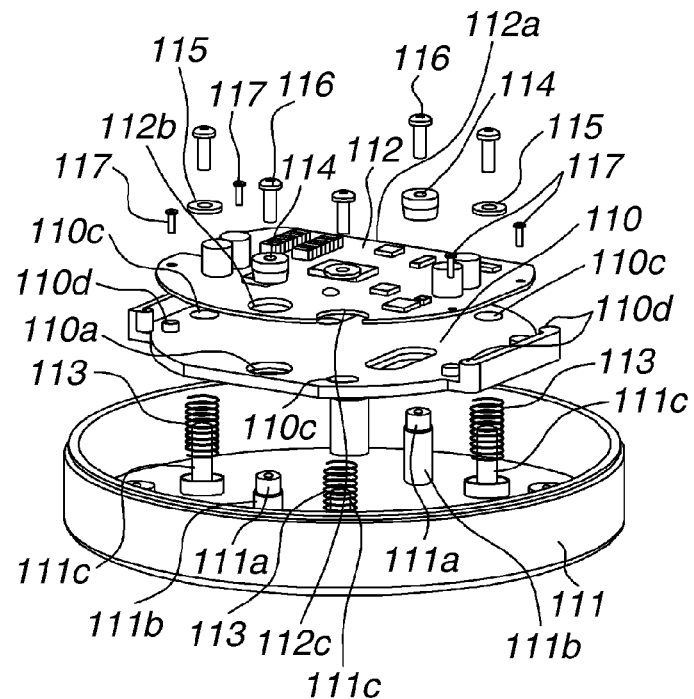
FIGS. 7A and 7B are assembly diagrams illustrating a stationary stand unit according to the second exemplary embodiment.
Figure 7B:
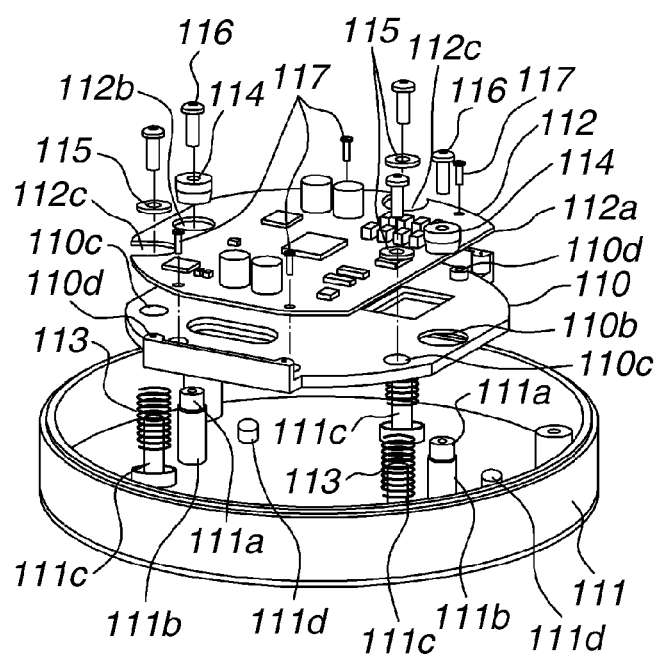

FIGS. 7A and 7B are detailed assembly diagrams illustrating the stationary stand unit 105. At the bottom of the stationary stand portion 111, three bar-like guide portions 111c are erected at equal intervals, and a coil spring serving as an elastic member 113 is arranged and retained around each guide portion 111c. As described below, the elastic members 113 elastically support the camera unit 100 so as to allow it to make a retreating movement in the vertical direction and a slanting direction when a force is applied thereto from the dome cover.

The movable base portion 110 has holes 110c that allow the guide portions 111c to pass therethrough but do not allow the elastic members 113 to pass therethrough. With the guide portions 111c passed through the holes 110c, stopper members 115 are screwed on the upper ends of the guide portions 111c.

Figure 9A:
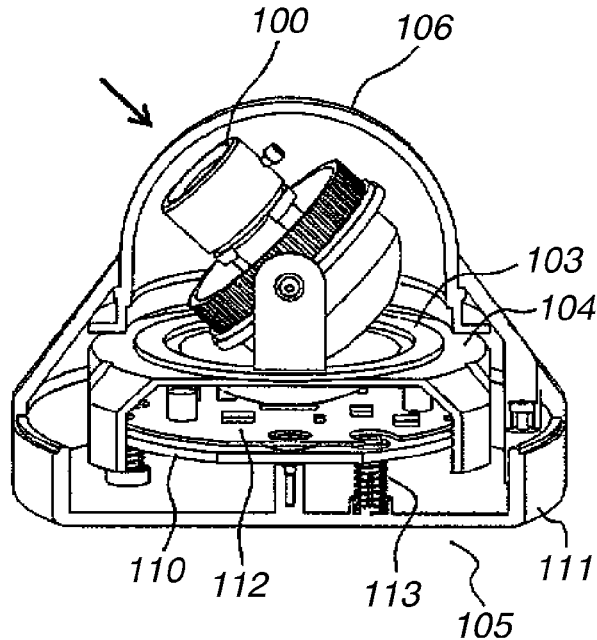
FIGS. 9A and 9B are diagrams illustrating the interior state of the monitoring camera apparatus when a camera is operating and when a shock absorbing mechanism is operating according to the second exemplary embodiment.

As a result, the movable base portion 110 is urged in the vertical direction (in the direction of the dome cover) by the elastic members 113 arranged and retained around the guide portions 111c, and is maintained at a predetermined height position by the stopper members 115 (See FIG. 9A). While this exemplary embodiment employs the holes 110c, it is also possible to form cutouts instead.

The movable base portion 110 is provided with screw hole portions 110d for fixing the circuit board 112 in position by screws 117. The circuit board 112 is formed so as not to interfere with the guide portions 111c and the stopper members 115. In the present exemplary embodiment, a part of the circuit board 112 has an outer shape 112a to avoid interference with the guide portions 111c and the stopper members 115, and there are formed cutouts 112c through which the guide portions 111c and the stopper members 115 can pass.

A pair of retaining portions 111b are erected on the bottom portion of the stationary stand portion 111. At the distal ends of the retaining portions 111b, there are formed fit-engagement portions 111a reduced in diameter, to which positioning members 114 are fixed. So long as they are capable of fit-engagement with the positioning members 114, it is not necessary for the fit-engagement portions 111a to be reduced in diameter.

Further, the movable base portion 110 has holes 110a and 110b to be fit-engaged with part of the positioning members 114. While the present exemplary embodiment employs the holes 110a and 110b, it is also possible to form cutouts instead.

The circuit board 112 is formed so as not to interfere with the retaining portions 111b and the positioning members 114. In the example illustrated in FIGS. 7A and 7B, a part of the circuit board 112 has the outer configuration 112a to avoid interference with the retaining portions 111b and the positioning members 114, and there are formed holes 112b through which the retaining portions 111b and the positioning members 114 can pass.

Further, at the bottom of the stationary stand portion 111, there are provided two convex portions 111d that come into contact with the movable base portion 110 when the movable base portion 110 moves in the vertical direction or a slanting direction more than a fixed level. The number of convex portions 111d may be provided two or more.

Due to the provision of the convex portions 111d, it is possible to regulate the movable range of the movable base portion 110, and to prevent chafing between the hole 110a or the hole 110b of the movable base portion 110 and the retaining portions 111b provided on the stationary stand portion 111. This will be described in detail below with reference to FIGS. 8A and 8B.

Figure 8A:
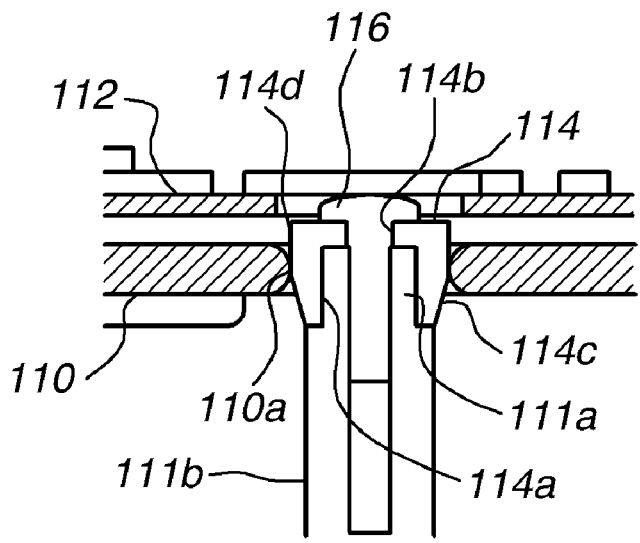
FIGS. 8A and 8B are sectional views illustrating a movable base portion and a positioning member in the second exemplary embodiment.
Figure 8B:
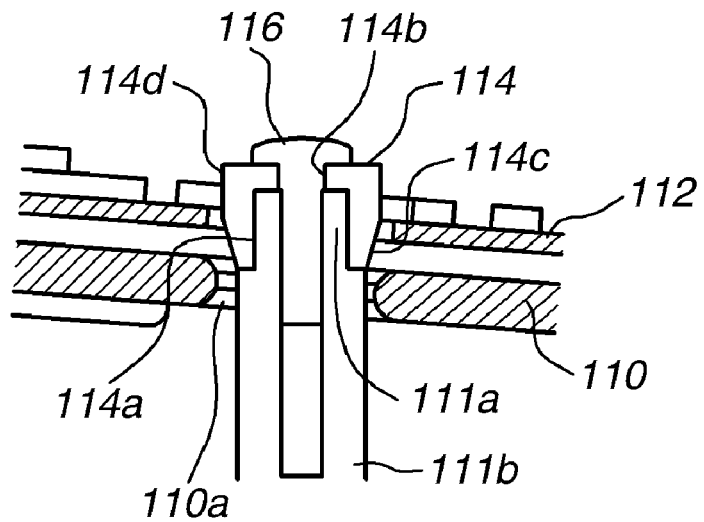

As illustrated in FIGS. 8A and 8B, each positioning member 114 has a fit-engagement hole portion 114a fit-engaged with the fit-engagement portion 114a of the retaining portion 111b, and a screw hole portion 114b fixed to the retaining portion 111b by a screw 116.

Further, each positioning member 114 has a fit-engagement portion 114d fit-engaged with a hole 101a, 101b of the movable base portion 110 in the state in which the movable base portion 110 is maintained at a predetermined height position by the stopper members 15 through urging by the elastic members 113. Further, each positioning member 114 has, on the side opposite to the dome cover, a tapered portion 114c provided to be continuous with the fit-engagement portion 114d so as to be gradually reduced in diameter as it extends therefrom.

As illustrated in FIGS. 8A and 9A, in the monitoring camera apparatus of the present exemplary embodiment, the movable base portion 110 is urged by the elastic members 113, and is maintained at a predetermined height by the stopper members 115. At this time, the fit-engagement portions 114d of the positioning members 114 are fit-engaged with the holes 101a and 101b of the movable base portion 110, so that the movable base portion 110 is fixed in position and direction. In the following, this state will be referred to as the normal state.

Figure 9B:
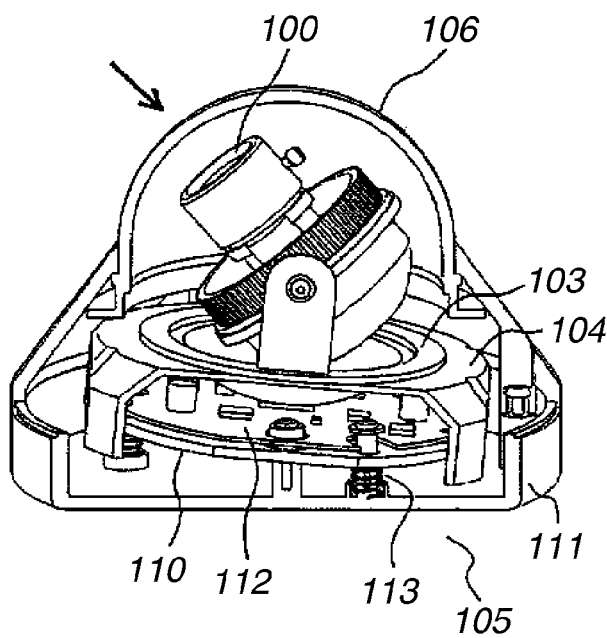
Figure 10:
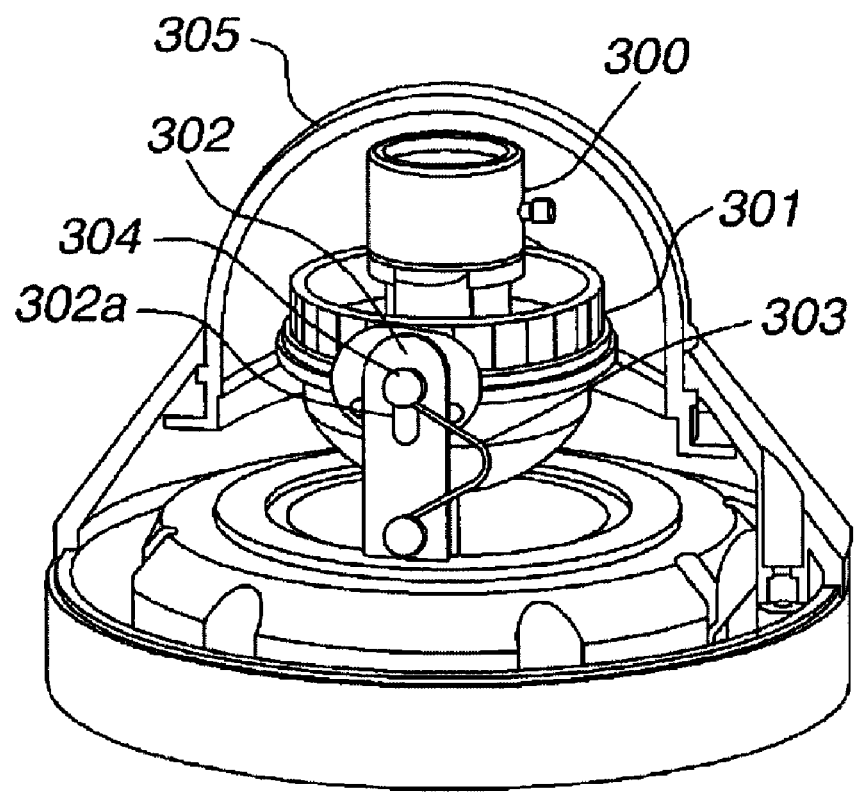
FIG. 10 is a schematic diagram of the interior structure of a monitoring camera apparatus equipped with a conventional shock absorbing mechanism.

And, as illustrated in FIGS. 8B and 9B, when a shock is applied to the dome cover, and a force acts on the camera unit 100, the movable base portion 110 moves slightly downwards, and each positioning member 114 is disengaged from the fit-engagement portion 114d. At this time, a clearance is secured between each positioning member 114 and the hole 110a, 110b of the movable base portion 110 due to the tapered portion 114c, and the movable base portion 110 can make a retreating movement in a slanting direction.

Similar to the first exemplary embodiment, in the present exemplary embodiment also, shock absorption is possible with respect to a shock applied to the cover from various directions although the shock absorption amount varies as the shock direction is changed from a direction perpendicular to the dome cover to a direction horizontal thereto.

After this, when the shock applied to the dome cover is damped, the movable base portion 110, which is urged by the elastic members 113, is restored to the normal state, with the holes 110a and 110b of the movable base portion 110 being guided by the tapered portions 114c.

Further, in FIGS. 8A and 8B, the clearance between the hole 110a (or the hole 110b) of the movable base portion 110 and the retaining portion 111b of the stationary stand portion 111 is reduced through the slanting movement of the movable base portion 110.

When the slanting angle of the movable base portion 110 exceeds a predetermined amount, the hole 110a (or the hole 110b) of the movable base portion 110 and the retaining portion 111b are brought into contact with each other, and there is a fear of chafing being generated. In view of this, the convex portions 111d are provided on the stationary stand portion 111, whereby it is possible to regulate the movable range of the movable base portion 110 within a range not involving generation of chafing, thereby preventing damage of the holes 110a and 110b of the movable base portion 110 and of the retaining portions 111b.

In the present exemplary embodiment, the circuit board 112 is fixed to the movable base portion 110, and, when a shock is applied to the dome cover, the circuit board 112 makes a retreating movement in the vertical direction and a slanting direction together with the movable base portion 110.

The circuit board 112 may be fixed in position by providing screw hole portions in the stationary stand portion 111, however, in that case, a shock applied to the dome cover or the exterior casing is easily transmitted to the circuit board 112 via the stationary stand portion 111. Thus, there is an increased fear of the solder portion of the components mounted on the circuit board 112 being cracked or the connectors being disconnected.

In contrast, in the present exemplary embodiment, the circuit board 112 is fixed to the movable base portion 110 that is urged by the elastic members 113, whereby it is possible to mitigate the shock applied to the mounted components.

Further, as described above, during its movement, the circuit board 112 does not interfere with the portions 111a, 111b, and 111c of the stationary stand portion 111, and the connected members 114 and 115. As a result, the same space can serve both as the space for mounting the components and as the space for allowing the movable base portion 110 and the circuit board 112 to move, thus making it possible to achieve a reduction in the size of the monitoring camera apparatus.

As described above, in the monitoring camera apparatus according to the present exemplary embodiment, the movable base portion 110 is urged by the three elastic members 113 arranged and retained on the stationary stand portion 111, thereby allowing the interior structure including the camera unit 100 to make a retreating movement in the vertical direction and a slanting direction. Through this retreating movement of the camera unit 100, the distance between the camera unit 100 and the dome cover increases, whereby it is possible to shock-absorb the deformation amount of the dome cover corresponding to the increase in distance.

Further, due to the fit-engagement portions 114d of the positioning members 114, the camera unit 100 is fixed in position and direction during its operation, and can be accurately restored to the former operating position and direction again after the retreating movement due to the tapered portions 114c.

While in the present exemplary embodiment the convex portions 111d are provided on the stationary stand portion 111, they may be provided on the movable base portion 110 instead, and as long as they can regulate the movable range of the movable base portion 110, the convex portions 111d may also be formed by separate components.

While in the above-described exemplary embodiments, three elastic members 15 (113) are used, they may be replaced by a single elastic member as long as it allows a vertical and slanting movement, or depending on the interior structure, it is not always necessary for the elastic members to be uniformly arranged. Further, their number may be three or more.

In the case of a single elastic member, an elastic member capable of displacing in vertical and slanting directions is required. On the other hand, in the case in which there are provided at least three elastic members each independently providing an urging force, as long as they are capable of displacement in the vertical direction, it is possible to realize a slanting attitude of the camera unit 10 (100) through a difference in displacement between the at least three elastic members.

Generally adopted elastic members easily guarantee elasticity in a single direction, so, by adopting this construction, the stability of the shock absorbing mechanism is increased. While in the above-described examples coil springs are used as the elastic members, it is also possible to employ elastic members consisting of rubber, plate springs, or the like.

While in the above-described exemplary embodiments the positioning members 16 (114) and the stopper members 17 (115) are provided as separate members, it is also possible to integrate them with each other depending on the elastic members 15 (113) and the interior structure adopted. For example, when a flange configuration is added to the positioning members 16 (114), the positioning members 16 (114) can also function as the stopper members 17 (115). Alternatively, it is also possible to add fit-engagement portions and tapered portions to the stopper members 17 (115), thereby adding a positioning function to the stopper members.

A modification of the rotary support unit 30 of the first exemplary embodiment in which the positioning members and the stopper member are integrated (combined) will be described. In this modification, the components that are similar to those of the first exemplary embodiment are designated by the same reference numerals, and a description thereof will be omitted.

Figure 11:
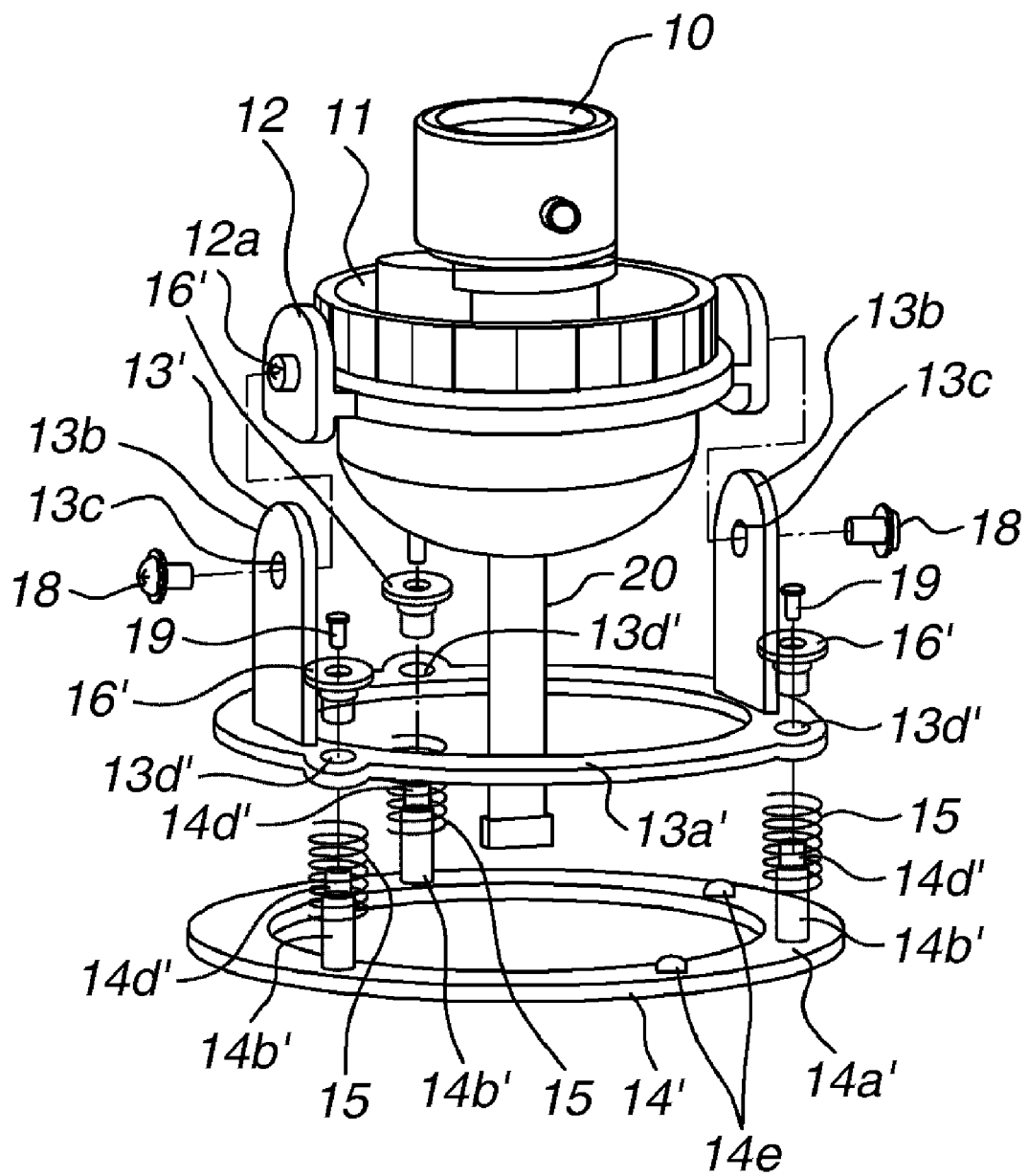
FIG. 11 is an assembly diagram illustrating a rotary support unit according to a modification of the first exemplary embodiment.

First, FIG. 11 is a detailed assembly diagram illustrating a modification of the rotary support unit 30 illustrated in FIG. 2. As illustrated in FIG. 11, three bar-like guide portions 14b' are arranged at equal intervals on an annular base plate portion 14a' of a pan rotary support member 14', and elastic members 15 are arranged and retained around the guide portions 14b'. And, at the distal ends of the guide portions 14b', there are formed fit-engagement portions 14d', to which positioning members 16' are fixed.

Further, holes 13d' fit-engaged with a part of the positioning members 16' are formed in an annular base plate portion 13a' of a tilt support stand 13'. The holes 13d' allow passing of the guide portions 14b' therethrough but do not allow passing of the elastic members 15 therethrough. And, in the state in which the guide portions 14b' have been passed through the holes 13d', the positioning members 16' are screwed on the fit-engagement portions 14d'.

Figure 12:
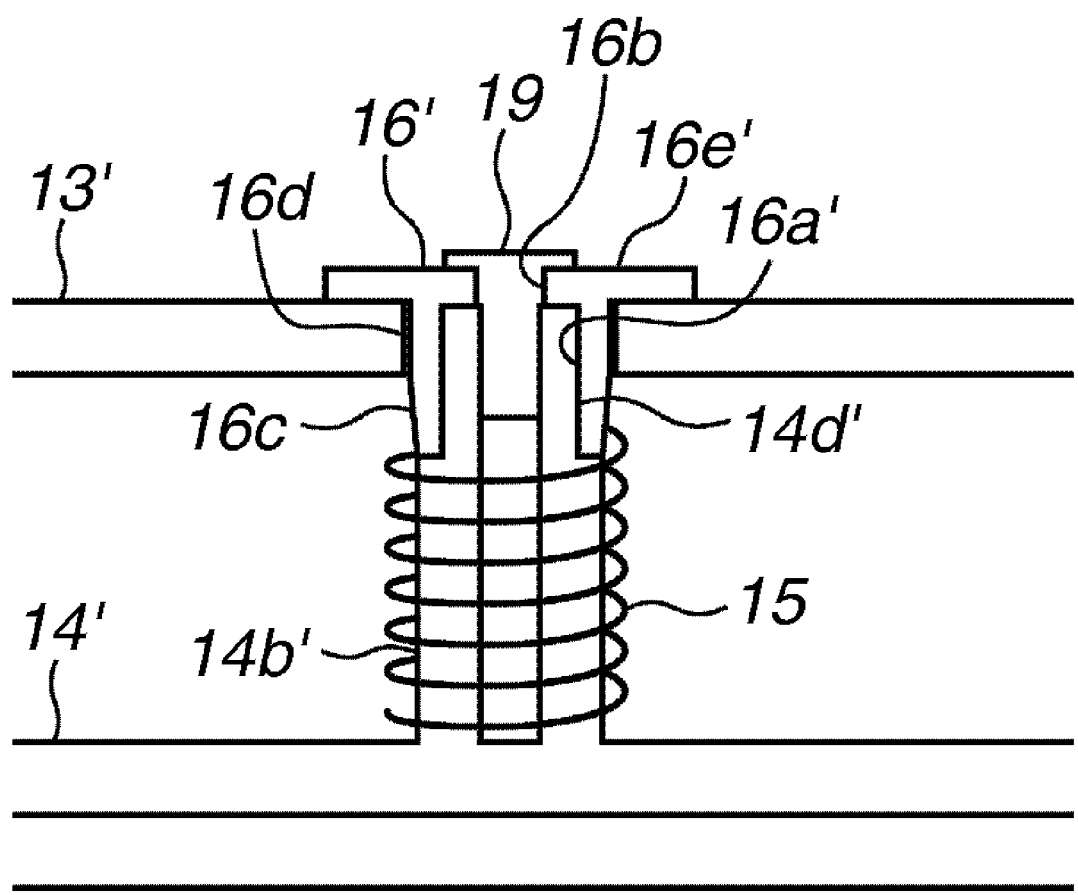
FIG. 12 is a sectional view of a tilt support stand and a positioning member in a modification of the first exemplary embodiment.

Next, FIG. 12 is a sectional view of the tilt support stand 13' and the positioning member 16' of this modification. As illustrated in FIG. 12, the positioning member 16' has a fit-engagement portion 16a' fit-engaged with the fit-engagement portion 14d' of the guide portion 14b', and a screw hole portion 16b fixed to the guide portion 14b' by a screw 19.

Further, in the outer periphery of the upper end portion of each positioning member 16', there is provided a flange portion 16e' protruding outwards. Thus, in the present modification, the tilt support stand 13' is urged in the vertical direction (in the direction of the dome cover) by the elastic members 15 arranged and retained around the guide portions 14b', and abuts the lower surface of the flange portions 16e' to be thereby maintained at a predetermined height position.

Subsequently, a modification of the stationary stand unit 105 of the second exemplary embodiment in which the positioning members and the stopper members are integrated (combined) will be described. In this modification, the elements that are similar to those of the counterpart of the second exemplary embodiment are designated by the same reference numerals, and a description thereof will be omitted.

Figure 13:
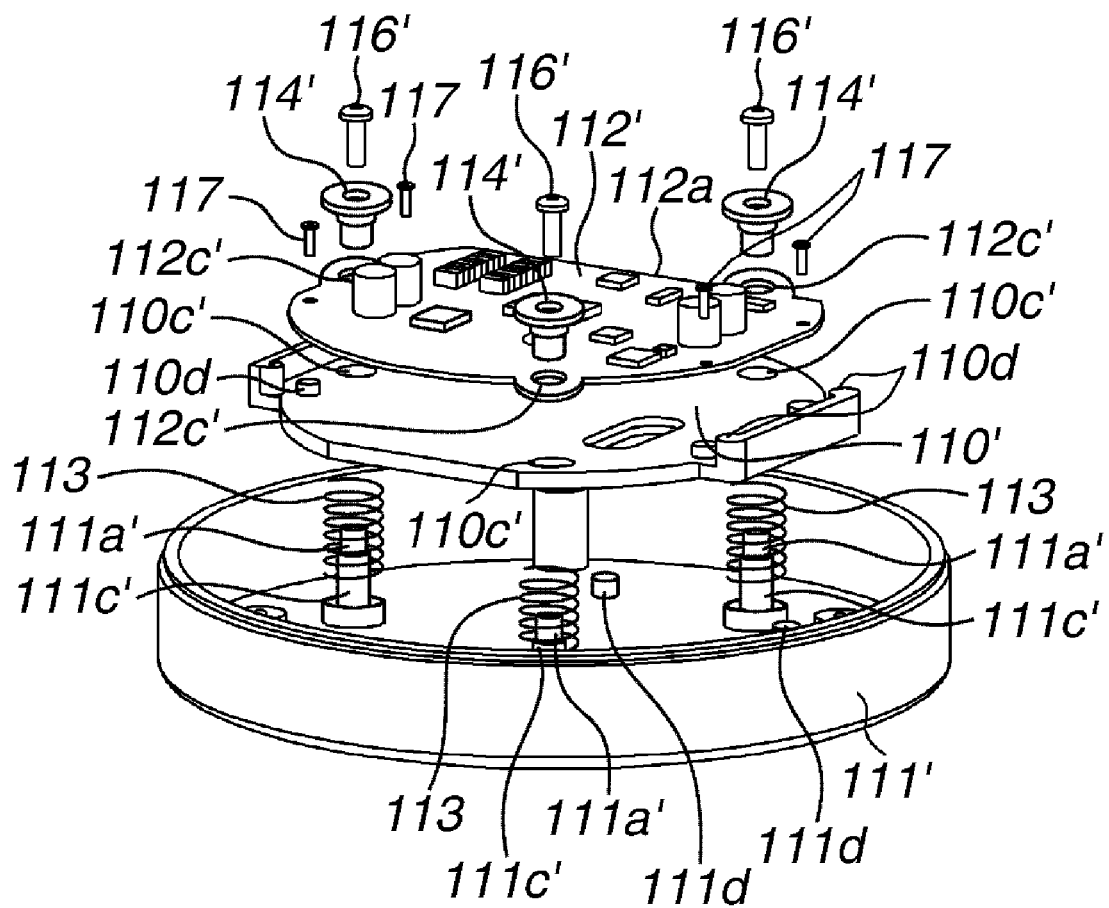
FIG. 13 is an assembly diagram illustrating a stationary stand unit in a modification of the second exemplary embodiment.

First, FIG. 13 is a detailed assembly diagram illustrating a modification of the stationary stand unit 105 illustrated in FIGS. 7A and 7B.

As illustrated in FIG. 13, three bar-like guide portions 111c' are arranged at equal intervals on the bottom portion of a stationary stand portion 111', and elastic members 113 are arranged and retained around the guide portions 111c'. And, at the distal ends of the guide portions 111c', there are formed fit-engagement portions 111a' reduced in diameter, to which positioning members 114' are fixed.

A movable base portion 110' has holes 110c' fit-engaged with part of the positioning members 114'. And, like the movable base portion 110', a circuit board 112' has holes 112c' fit-engaged with part of the positioning members 114'.

The holes 110c' and the holes 112c' allow insertion of the guide portions 111c' but do not allow insertion of the elastic members 113. And, in the state in which the guide portions 111c' have been passed through the holes 110c' and the holes 112c', the positioning members 114' are screwed on the fit-engagement portions 111a'.

Figure 14:
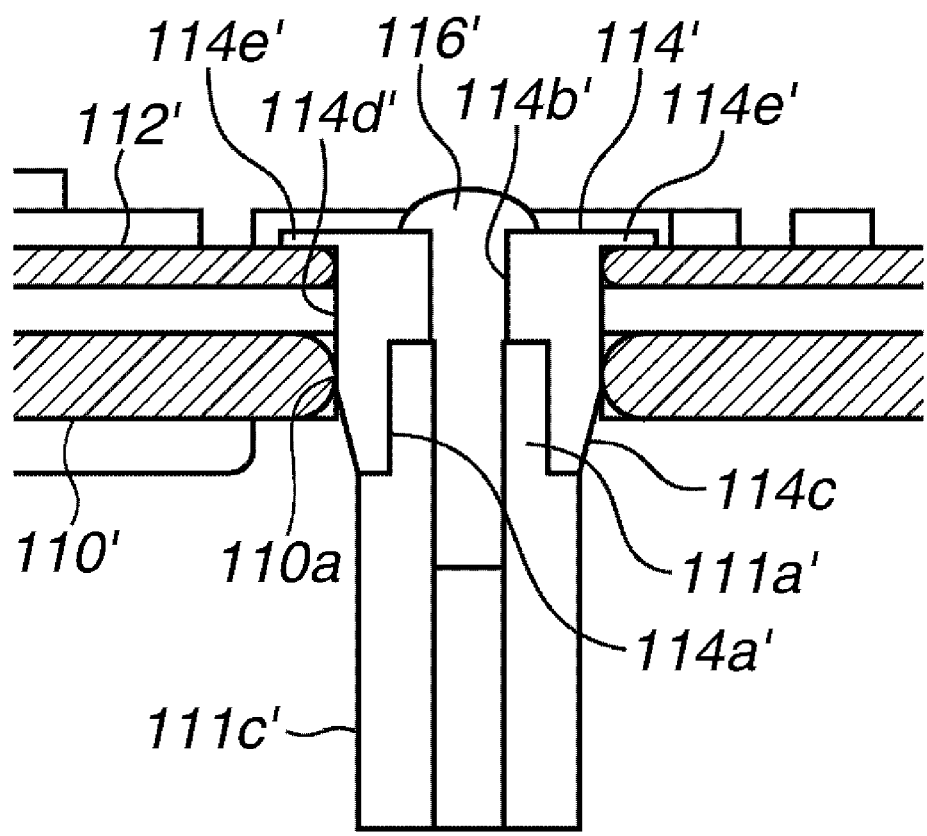
FIG. 14 is a sectional view of a movable base portion and a positioning member in a modification of the second exemplary embodiment.

Next, FIG. 14 is a sectional view of the movable base portion 110' and the positioning member 114' of the present modification. As illustrated in FIG. 14, each positioning member 114' has a fit-engagement portion 114a' fit-engaged with the fit-engagement portion 111a' of the guide portion 111c', and a screw hole portion 114b' fixed to the guide portion 111c' by a screw 116'. Further, in the outer periphery of the upper end portion of the positioning member 114', there is provided a flange portion 114e protruding outwards.

Thus, in this modification, the movable base portion 110' and the circuit board 112' are urged in the vertical direction (in the direction of the dome cover) by the elastic members 113 installed and retained around the guide portions 111c', and the upper surface of the circuit board 112' abuts the lower surfaces of the flange portions 114e', whereby the movable base portion 110' can be maintained at a predetermined height position.

The exemplary embodiments of the present invention described in detail above should not be construed restrictively, and various modes are to be covered by the present invention without departing from the scope of the gist thereof. Further, part of the above exemplary embodiments may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-183630 filed Aug. 6, 2009, which is hereby incorporated by reference herein in its entirety.

What is claimed is:

1. An imaging apparatus equipped with a shock absorbing mechanism, the imaging apparatus comprising:
   a camera unit including a lens and an image sensor;
   a cover configured to cover the camera unit;
   a movable base portion coupled to the camera unit;
   a stationary stand portion;
   an elastic member provided on the stationary stand portion and positioned to urge the movable base portion so as to allow the camera unit to make a retreating movement in a vertical direction and a slanting direction when a force is applied from the cover; and
   a positioning member having a fit-engagement portion defining a substantially uniform width dimension, the positioning member being configured to extend completely through and be fit-engaged with a minimum diameter portion of at least one of a hole and a cutout provided in the movable base portion when the movable base portion is at a predetermined position.

2. The imaging apparatus according to claim 1, further comprising:
   a support member configured to tilt-rotatably support the camera unit; and
   a base portion supported by the movable base portion and configured to pan-rotatably support the support member.

3. The imaging apparatus according to claim 1, further comprising:
   a stopper member configured to maintain the movable base portion urged by the elastic member at the predetermined position.

4. The imaging apparatus according to claim 3, wherein the stopper member also serves as the positioning member.

5. The imaging apparatus according to claim 1, wherein at least three elastic sub-members each exhibiting elasticity in a single direction are provided as the elastic member.

6. The imaging apparatus according to claim 1, wherein the positioning member is provided with a tapered portion continuous with the fit-engagement portion so as to be gradually reduced in diameter from the fit-engagement portion toward the stationary stand portion.

7. The imaging apparatus according to claim 6, further comprising:
   a convex portion configured to regulate a movable range of the movable base portion.

8. The imaging apparatus according to claim 7, wherein the convex portion is provided on the stationary stand portion.

9. The imaging apparatus according to claim 7, wherein the convex portion is provided on the movable base portion.

10. The imaging apparatus according to claim 6, further comprising:
    a convex portion configured to come into contact with the movable base portion when the movable base portion moves in the vertical direction or the slanting direction more than a fixed distance.

11. The imaging apparatus according to claim 10, wherein the convex portion is provided on the stationary stand portion.

12. The imaging apparatus according to claim 10, wherein the convex portion is provided on the movable base portion.

13. An imaging apparatus equipped with a shock absorbing mechanism, comprising:
    a camera unit including a lens and an image sensor;
    a cover configured to cover the camera unit;
    a first support member configured to tilt-rotatably support the camera unit;
    a second support member configured to pan-rotate together with the first support member;
    an elastic member provided on the second support member and configured to urge the first support member elastically so as to allow the camera unit to make a retreating movement in a vertical direction and a slanting direction when a force is applied from the cover;
    a stopper member configured to maintain the first support member urged by the elastic member at a predetermined position; and
    a positioning member having a fit-engagement portion configured to be fit-engaged with at least one of a hole and a cutout provided in the first support member when the first support member is at the predetermined position, wherein the positioning member is provided with a tapered portion continuous with the fit-engagement portion so as to be gradually reduced in diameter toward the second support member.

14. The imaging apparatus according to claim 13, wherein the stopper member also serves as the positioning member.

15. The imaging apparatus according to claim 13, further comprising:
    a convex portion configured to regulate a movable range of the first support member.

16. The imaging apparatus according to claim 15, wherein the convex portion is provided on the second support member.

17. The imaging apparatus according to claim 15, wherein the convex portion is provided on the first support member.

18. The imaging apparatus according to claim 13, further comprising:
    a convex portion configured to come into contact with the first support member when the first support member moves in the vertical direction or the slanting direction more than a fixed level.

* * * * *